United States Patent [19]
Jelinek, Jr.

[11] Patent Number: 5,633,549
[45] Date of Patent: May 27, 1997

[54] BRUSHLESS PULSE DRIVE MOTOR

[76] Inventor: Charles Jelinek, Jr., 109 Seven Oaks Dr., Pendleton, S.C. 29670

[21] Appl. No.: 366,731

[22] Filed: Dec. 30, 1994

[51] Int. Cl.⁶ .......................... H02K 16/00; H02K 16/02
[52] U.S. Cl. .................. 310/114; 310/156; 310/152
[58] Field of Search ........................ 310/114, 156, 310/256, 254, 112, 152

[56] References Cited

U.S. PATENT DOCUMENTS

| | | | |
|---|---|---|---|
| 4,031,421 | 6/1977 | Geiger | 310/112 |
| 4,127,802 | 11/1978 | Johnson | 318/196 |
| 5,124,606 | 6/1992 | Eisenbeis | 310/114 |
| 5,144,180 | 9/1992 | Satake et al. | 310/212 |
| 5,194,773 | 3/1993 | Clarke | 310/112 |
| 5,200,659 | 4/1993 | Clarke | 310/112 |
| 5,337,030 | 8/1994 | Mohler | 310/156 |
| 5,475,277 | 12/1995 | Johnson | 310/156 |

*Primary Examiner*—Steven L. Stephan
*Assistant Examiner*—Elvin G. Enad
*Attorney, Agent, or Firm*—Cort Flint; Gerald R. Boss

[57] ABSTRACT

In this pulse driven motor, electromagnetic stators are mounted on the outside of an annular hollow nonferrous cage. The stators are "U" shaped and mounted with the open end of the "U" facing toward the motor shaft. The rotor is a dual disk assembly. Each disk has a plurarity of permanent magnets mounted along its outer edge. The stator yokes on the cage cross-bars and the rotor disks on the shaft are positioned so that the rotor magnets can pass through the yoke gaps. The angular displacement of the rotor disks and the respective placement of the pick-up probes generates a sequential stream of pulses which upon amplification drives the motor stators.

4 Claims, 3 Drawing Sheets

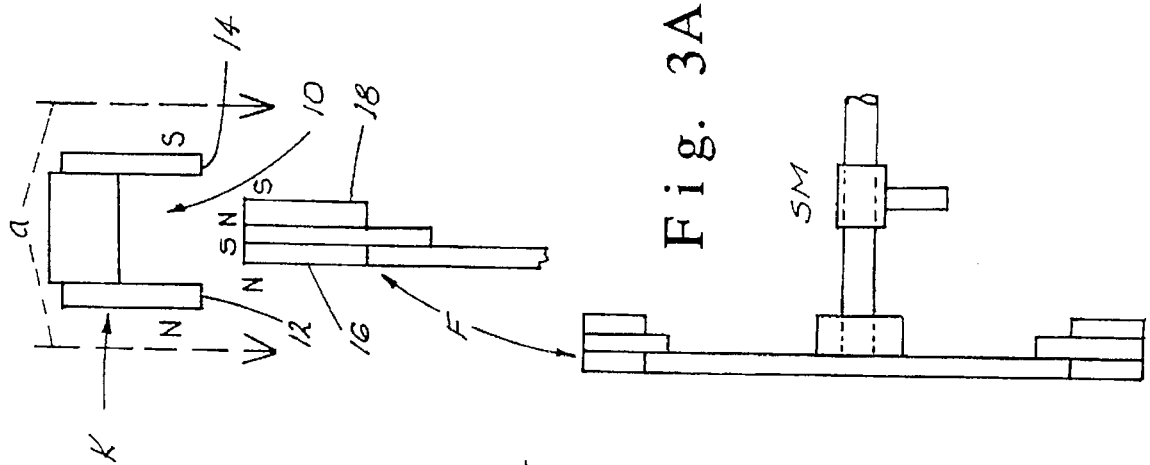
Fig. 3A
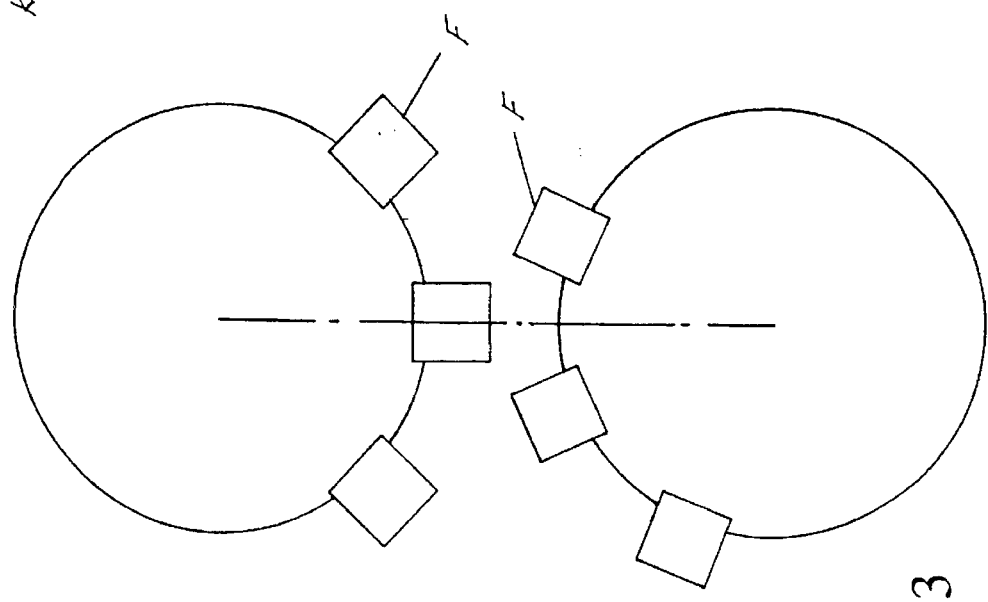
Fig. 3
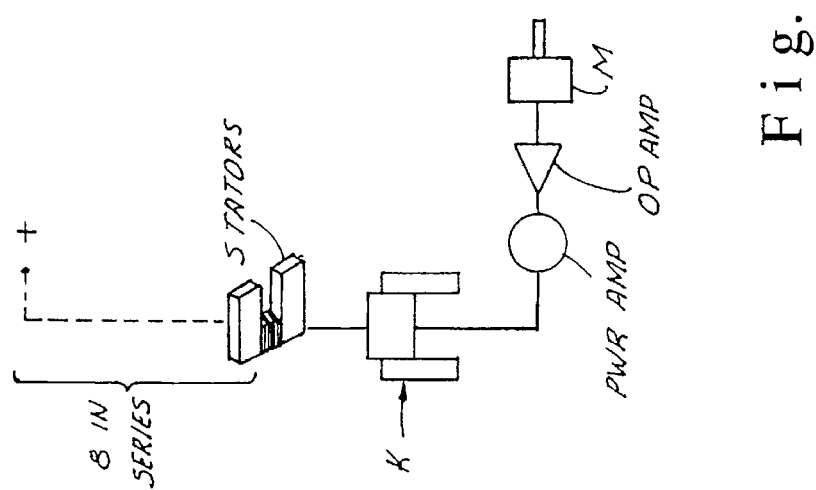

BRUSHLESS PULSE DRIVE MOTOR

BACKGROUND

A DC brushless motor titled "Pulse Driven Electric Car Motor" was entered into the Disclosure Program Mar. 10, 1993, #32717.

The use of conventional DC or AC motors to operate automobiles is limited due to heavy current drain from storage batteries. One method of reducing the average current is to use pulsed stator power and permanent magnet rotors. A motor design to accomplish this is described herein.

BRIEF DESCRIPTION OF THE DRAWINGS

FIGS. 3 and 3A illustrate operation of rotor passing through U-shaped stator with signals generated from a pulse generator.

DESCRIPTION AND OPERATION

Figure 1:
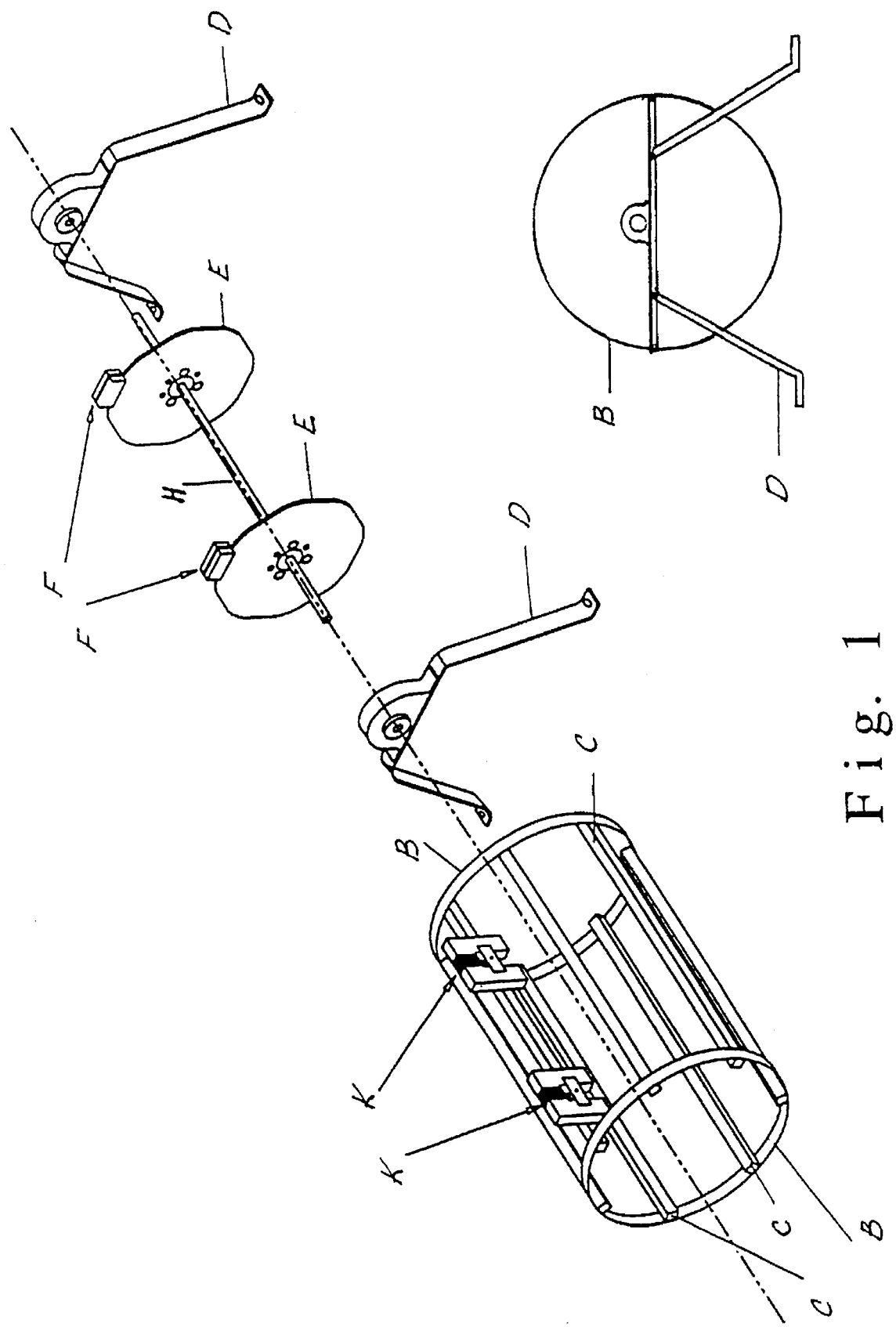
FIG. 1 is a perspective view of the stator mounting assembly.

In this motor, the stator mounting assembly (FIG. 1) takes the place of a common motor frame. It is a hollow annular cage formed by two circular metal bands (b) connected by eight cross-bars (c). End brackets (d) fastened to the metal bands (b) support the motor assembly. An end view of the end bracket and bearing is FIG. 1 (j).

Figures 2, 2A:
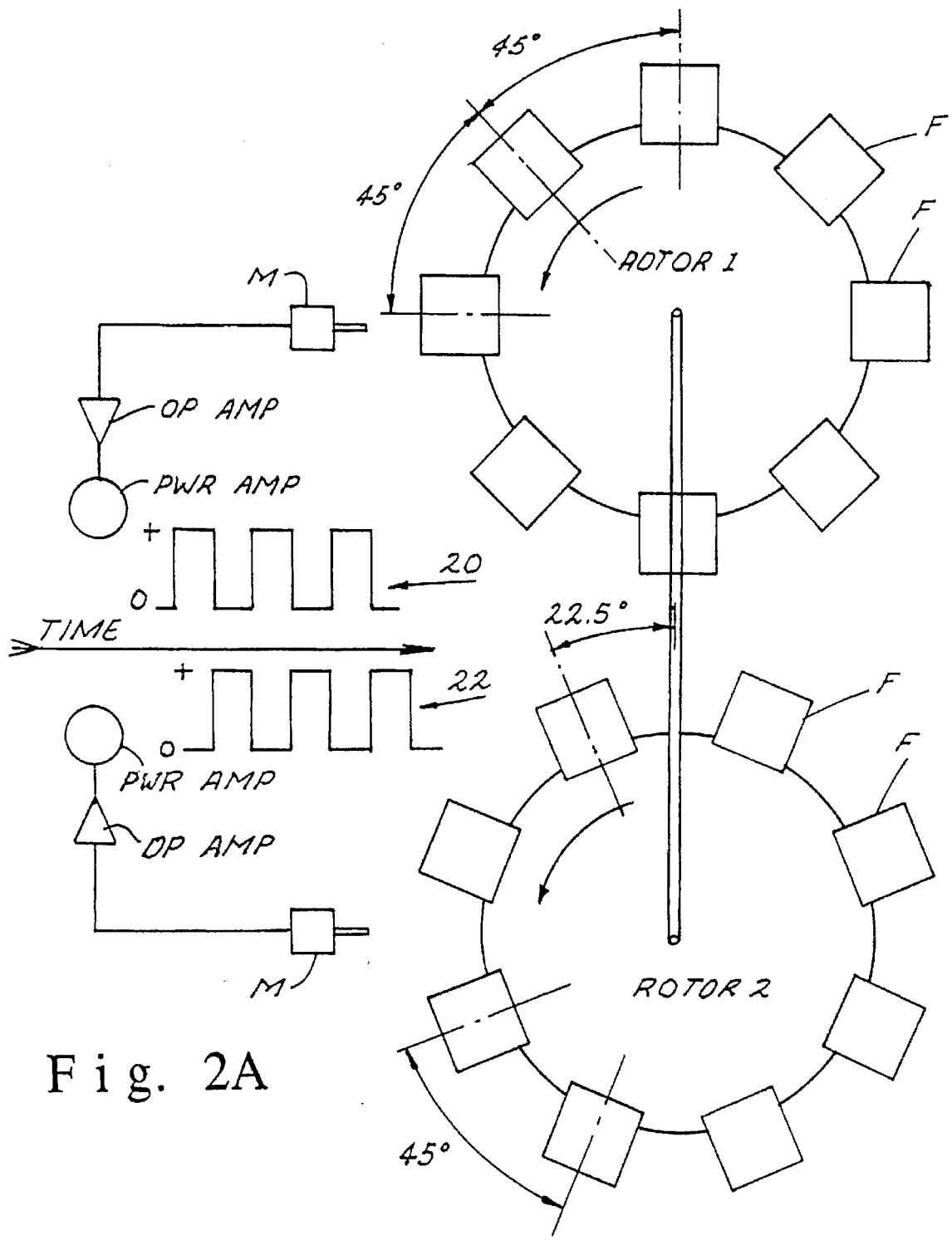
FIGS. 2 and 2A show the rotor with permanent magnets mounted along its outer edge at a predetermined angular relationship and development of the pulse stream.

The rotor consists of two identical aluminum disks (e) mounted on shaft (h). In this embodiment, each disk has eight rectangular permanent magnets mounted along its outer edge at 45° points (FIG. 2). The space between magnets is equal to the magnet length. The rotor disks are keyed to the shaft at an angular relationship of 22½° which is half the distance between magnets. The angular staggering of magnet position between the two rotor disks is required for the development of a sequential pulse stream as depicted in (FIG. 2). Pulse pick-up probes or hall effect sensors (m) are positioned near the base of each disk.

Stator electromagnets (k) yokes (FIG. 3) are "U" shaped cores formed from soft iron transformer laminations. The winding is on the horizontal portion of the "U". Two yokes (FIG. 1) are mounted on each cross-bar. The lateral position of each stator yoke is directly over the respective rotor disk (FIG. 3). Vertical position is adjustable. With equal mechanical clearance between rotor magnets on both sides of the stator gap, the rotor will spin easily. A small start motor (FIG. 3 sm) or a momentary release of a cocked spring can initiate rotation.

Rotation can be as little as 45° to have a rotor magnet pass a pick-up probe and generate a sinusoidal current pulses. A standard operational amplifier (OP ANP 741) (FIG. 2) is operated in a saturated manner whereby the pulses are squared and amplitude limited. The resulting pulse stream is depicted in (FIG. 2) at the input to the power amplifier (PWR). The display also shows the time relationship of pulses from each of the rotor disks. The pulses occur sequentially with no time lapse; therefore, no cogging in the output power.

The polarity of the rotor magnets and that of the stator gap (FIG. 3) during pulse current flow are identical; a repulsive force is generated. As shown in FIG. 3 as rotor F passes through electromagnetic U-shaped stator K through a stator gap 10 a pulse will be generated from the pulse generator thereby energizing the electromagnetic U-shaped stator K such that the electromagnetic U-shaped stator K will have the same polarity on the corresponding leg of the U shaped stator which corresponds to that polarity of the face of the permanent magnet opposing the stator leg. For instance, in FIG. 3, electromagnetic U-shaped stator K has a first leg 12 which is charged to have a north pole polarity which is the same charge as permanent magnet 16 which opposes stator leg 12. Also, electromagnetic U shaped stator K has a second leg 14 which has the same polarity as the opposing permanent magnet 18 which in this case is a south pole polarity. Accordingly, when the pair of electromagnets 16 and 18 which are grouped together to form permanent magnet group F passes through stator gap 10, the similarity of the polarity of the stator legs and the opposing permanent magnets repels the permanent magnet group F and due to momentum pushes the rotor in the direction at which the rotor is traveling. The magnets are rectangular high energy ceramic Tandy Corp. #64-1877. FIG. 3 shows stator yokes in series; yokes can be connected to individual driving circuits that are triggered simultaneously.

As shown in FIGS. 2 and 3, the permanent magnet groups on each rotor are spaced approximately 45° from one another. Also, the permanent magnets on rotor 2 are offset approximately half the distance of the spacing from the permanent magnets on rotor 1 which corresponds to approximately 22½°. This configuration results in constantly positioning a respective permanent magnet group before a respective of a pulse generator whereby a pulse is constantly being generated either for repulsing the permanent magnets on rotor 1 or rotor 2. This is reflected in FIG. 2A. As shown in FIG. 2A, a pulse is generated by a pulse generator when a permanent magnet on rotor 1 passes by a pick-up probe generally illustrated as 20, which energizes the stators corresponding with rotor 1 resulting in the permanent magnets on rotor 1 being repulsed by respective stators. At this time no permanent magnets on rotor 2 are positioned within a respective stator gap. However, as rotor 2 turns twenty-two and a half degrees from momentum, a respective permanent magnet on rotor 2 passes 22 by a second pick up probe resulting in a pulse being generatred thereby energizing the stators corresponding with rotor 2 resulting in the permanent magnets on rotor 2 being repulsed. At this time no permanent magnets on rotor 1 are positioned within a respective stator gap. Accordingly, as noted, the pulses generated by pick up probe 20 are offset from the pulses generated by pick up probe 22 such that when a pulse is not generated from pick up probe 20, a pulse is generated from pick up probe 22. Accordingly, there will always be a pulse generated which repulses either rotor 2 or either rotor 1 depending on which rotor has a permanent magnet passing through a respective stator gap. In this fashion, rotational force is always applied to rotate shaft H.

I claim:

1. A pulse drive motor comprising:

a rotor including at least a first disk having an outer edge;

a plurality of permanent magnets spaced evenly along said outer edge of said disk;

a plurality of electromagnetic stators, a respective of said stators being spaced from said disk;

each of said electromagnetic stators having a first stator side and a spaced second stator side defining a stator gap;

said permanent magnets being carried by said disk so that said magnets are carried through said stator gap as said disk rotate along a revolution thereby driving said motor;

at least one pick-up probe for sensing a permanent magnet and generating an electrical pulse for activating a respective for said electromagnetic status; and wherein a respective of said electromagnetic stator includes a first side having a first stator charge and a second side having a second stator charge, a respective of said permanent magnet having a first rotor side having a first rotor charge of the same polarity as said first stator charge and said permanent magnet having a second rotor side having a second rotor charge of the same polarity as said second stator charge whereby a respective of said permanent magnet is repulsed when passing through said stator gap.

2. The motor of claim 1 wherein said rotor includes a second disk, said second disk is carried along a shaft at an angular relationship of approximately twenty-two point five degrees with respect to said first disk whereby a sequential pulse stream is generated by said pick up probe.

3. The motor of claim 1 wherein said plurality of electromagnetic stators are simultaneously activated by said pulse generated by said pick-up probe.

4. The motor of claim 1 wherein said electromagnetic stators are electrically connected in series.

* * * * *